UNITED STATES PATENT OFFICE.

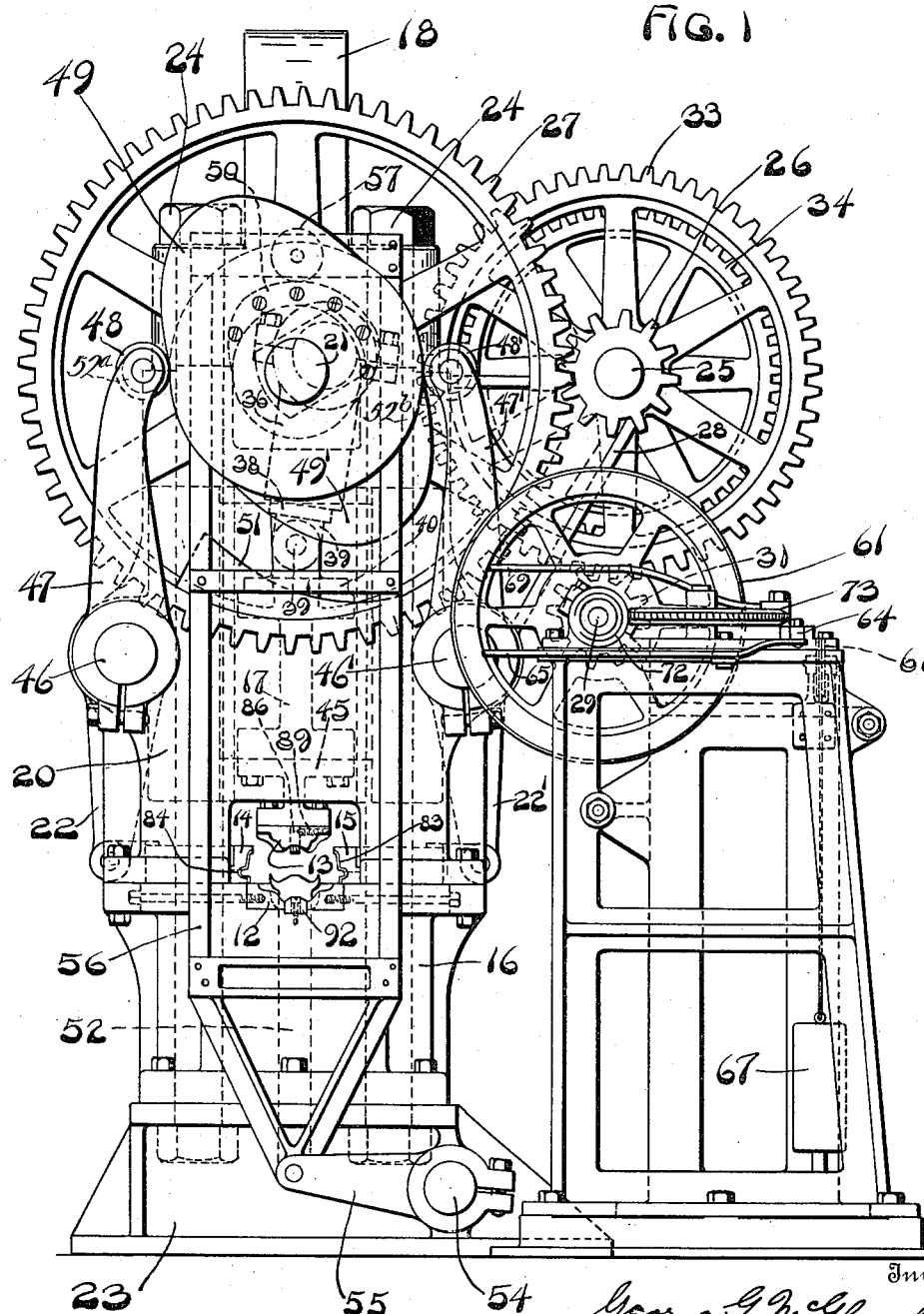

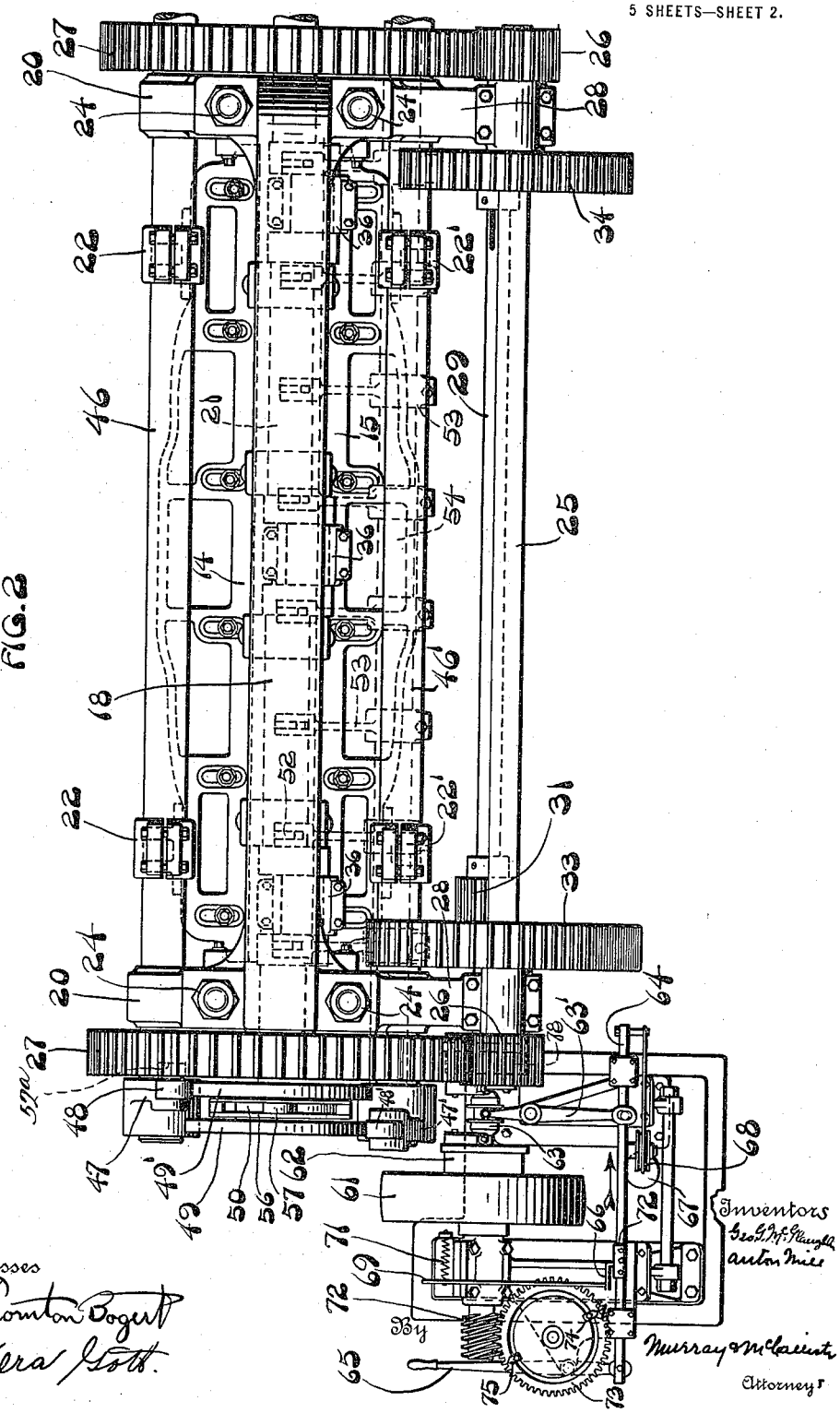

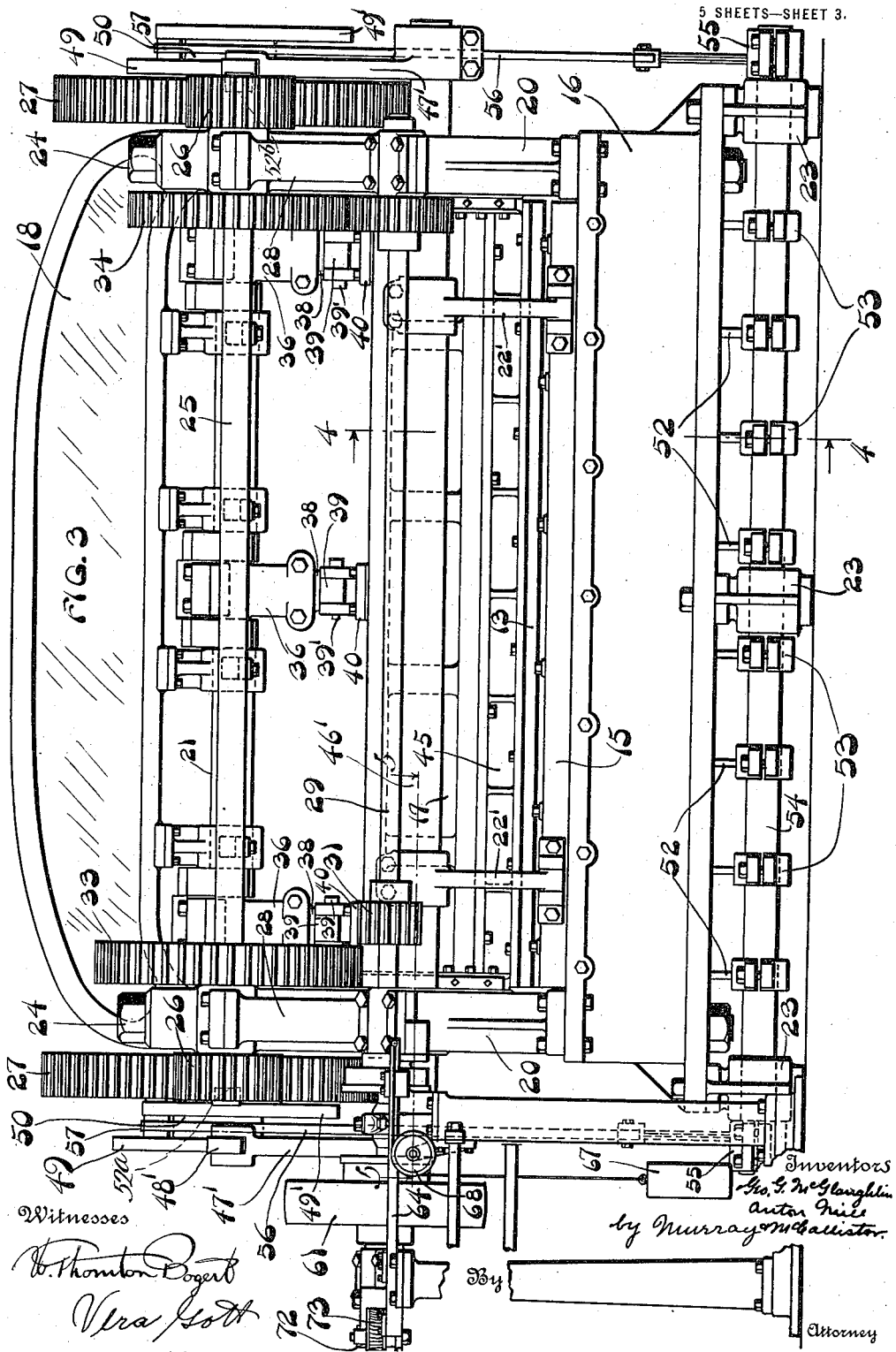

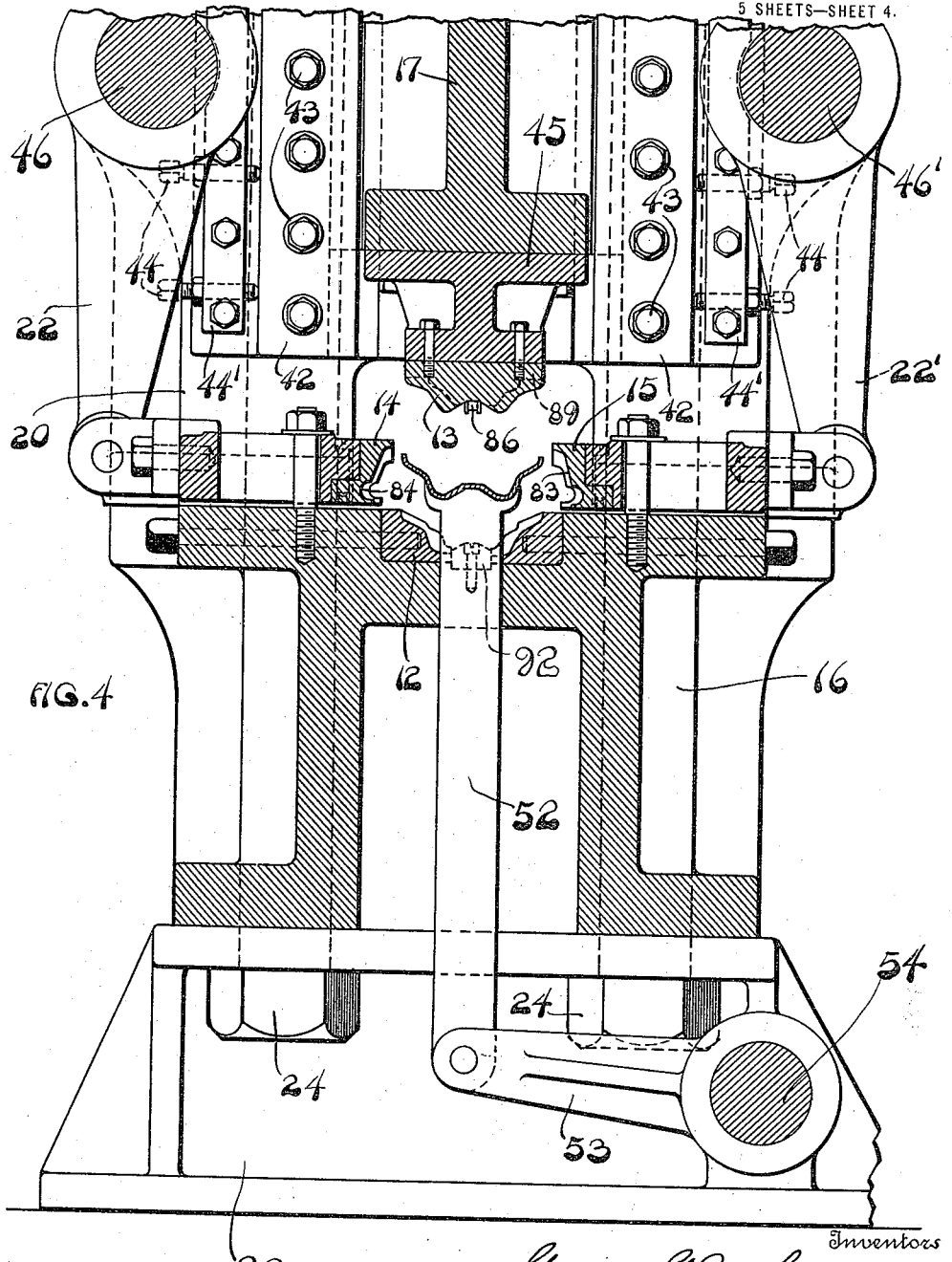

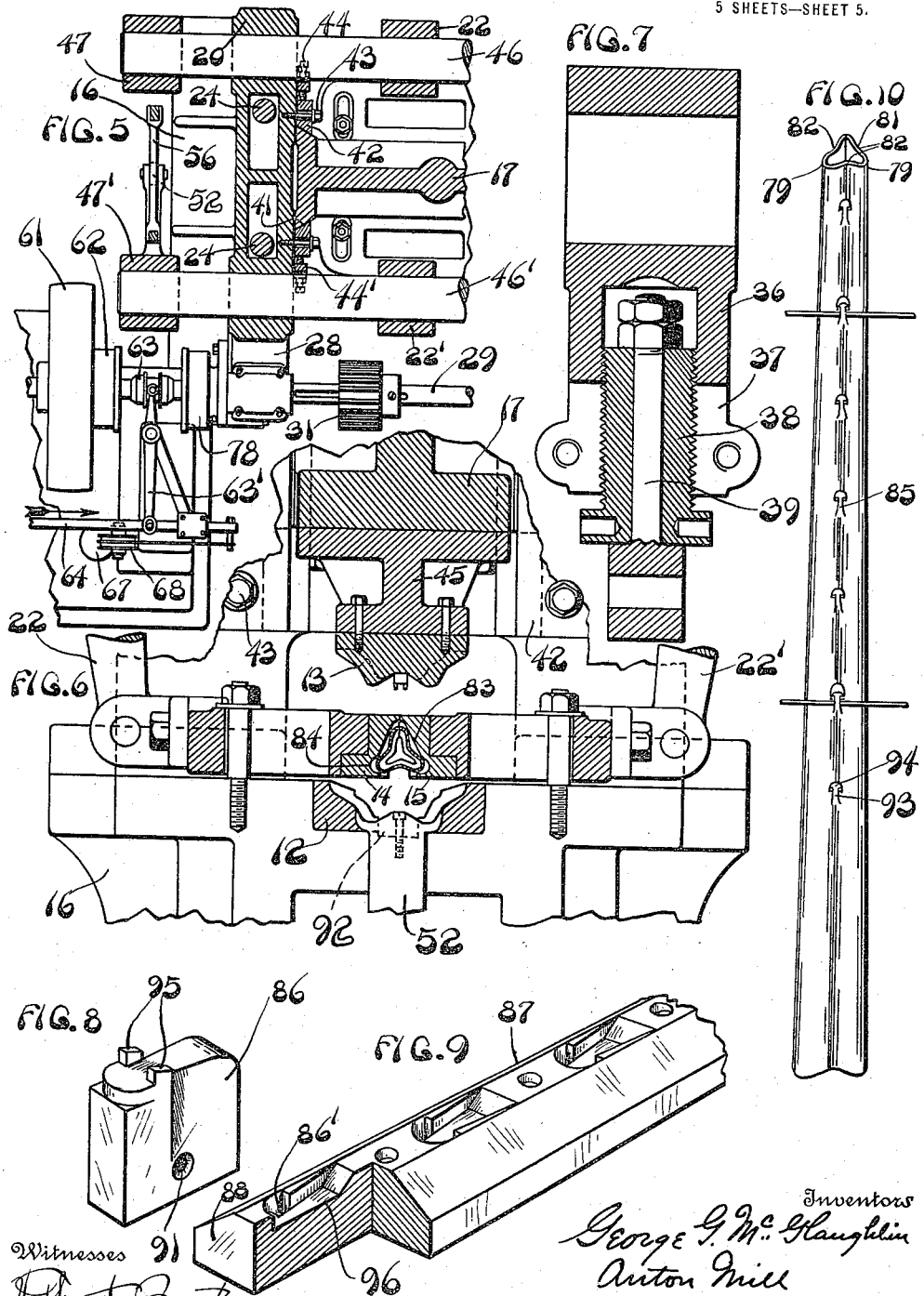

GEORGE G. McGLAUGHLIN AND ANTON MILL, OF CINCINNATI, OHIO, ASSIGNORS, BY DIRECT AND MESNE ASSIGNMENTS, OF ONE-HALF TO SAID McGLAUGHLIN AND ONE-HALF TO LAWRENCE K. SLABACK, OF SILVERTON, OHIO.

POST-FORMING MACHINE.

1,158,703.    Specification of Letters Patent.    Patented Nov. 2, 1915.

Application filed December 4, 1912. Serial No. 734,821.

*To all whom it may concern:*

Be it known that we, GEORGE G. McGLAUGHLIN and ANTON MILL, citizens of the United States of America, and residents of Cincinnati, county of Hamilton, and State of Ohio, have invented certain new and useful Improvements in Post-Forming Machines, of which the following is a specification.

This invention relates to metal presses and has for an object to produce a machine for manufacturing tubular sheet metal posts.

A further object is to produce a machine which will receive a sheet metal blank and will press it into a trifoliate form, without the necessity of handling the sheet during the forming operation.

A further object is to produce a machine provided with a plurality of sets of dies, which coöperate in the operation of forming a tubular metal post.

These and other objects we attain in a machine embodying the features herein described, and illustrated in the drawings accompanying and forming a part of this application.

In the drawings Figure 1 is a view of a machine embodying our invention. Fig. 2 is a plan view of the machine illustrated in Fig. 1, portions being broken away for convenience of illustration. Fig. 3 is a side elevation of the machine shown in Figs. 1 and 2, portions being broken away for convenience of illustration. Fig. 4 is a fragmental section along the line 4—4 of Fig. 3. Fig. 5 is a fragmental section along the line 5—5 of Fig. 3, the gears being removed for convenience of illustration. Fig. 6 is a fragmental sectional view corresponding to Fig. 4 and shows the finishing dies in the operative position. Fig. 7 is a sectional view of a piston rod which forms a detail of our invention. Fig. 8 is a perspective view of a tongue-cutting punch which forms an inset for one of the dies. Fig. 9 is a fragmental perspective view of a die, which forms an inset or a portion of one of the forming dies and which coöperates with the punch dies shown in Fig. 8. Fig. 10 is a perspective view of a post which may be formed by the machine illustrated.

The machine illustrated, as an embodiment of our invention, includes means for forming tubular metal posts from flat metal sheets, such that each sheet need not be handled during the process of forming a post. The means illustrated, for accomplishing this, consists of oppositely disposed dies 12 and 13, which coöperate with each other in initially bending or distorting the sheet metal blank, and a second pair of jaws or dies 14 and 15, which receive the metal blank after it has been initially distorted, and press it into the final shape. In the drawings, the two sets of dies are so located, relatively to each other, that the direction of the pressure exerted on the metal sheet by the set of finishing dies 14 and 15, is at right angles to the direction of the pressure exerted by the dies 12 and 13. As illustrated, the dies 12 and 13 are so arranged that the die 13 moves in a vertical plane, during the operation of initially bending or distorting the metal sheet or blank, and the dies 14 and 15 move in a horizontal plane, during the operation of finishing the post. It will, however, be understood that the dies 14 and 15 may be located in various positions, with relation to the dies 12 and 13, and that the direction of their line of action need not necessarily extend at right angles to the line of action of the die 13.

In accordance with the requirements of the United States patent statutes, and for the purpose of clearly disclosing our invention, we will now describe in detail the illustrated embodiment of our invention, but we desire it to be understood that various changes, modifications, omissions, additions, and substitutions may be made, without departing from the spirit and scope of our invention, as set forth by the claims appended to, and forming a part of, this application.

Referring to the drawings, throughout the several views of which like reference numerals indicate the same parts, in the illustrated embodiment of the invention, the die 12 is substantially the same length as the finished metal post, it extends longitudinally of the machine and is mounted rigidly on a die or table 16, which forms a part of the frame portion of the machine, and which extends longitudinally of the machine. The die 13 is of the same length as the die 12, its operating face is, in the main, convex, and is adapted to fit into the operating face of the die 12. The die 13 is mounted on a reciprocable plunger 17, which extends longitudinally of the machine and is guided, during its reciprocations, by ways which extend along end support members or pedestals 20, mounted on the table 16. The pedestals 20 are located at opposite ends of the table and coöperate in supporting an arched beam 18, which extends longitudinally of the machine and on which the bearings of a power shaft 21, which is herein shown as a crank shaft, are mounted.

The jaws, or dies 14 and 15 are mounted on the table 16 and are located on opposite sides of the die 12. These jaws are of the same length as the dies 12 and 13, and are capable of being moved toward and away from each other, across the table 16; and are respectively actuated by arms 22 and 22'.

The operating plunger 17, of the die 13, and the actuating arms 22 and 22', of the respective dies 14 and 15, are actuated by the crank shaft 21, which extends longitudinally of the frame of the machine and is journaled in suitable bearings mounted on the frame. The frame, in effect, consists of a bed plate 23, the die table 16, which is mounted on the plate 23, the pedestals 20, which are located at the ends of the die table 16, and the beam 18, which is supported at its ends by means of the pedestals 20. The beam is secured in place on the pedestals by means of bolts 24, which extend downwardly through the pedestals 20, the table 16 and the bed plate 23, and are anchored to the bed plate 23, as shown in Figs. 1, 2 and 3. In the drawings the bearings of the shaft 21 are shown suspended from and spaced along the beam 18, which, as has been said, forms a part of the frame. Each end bearing of the shaft is located in a recess, which is formed in the upper end of the adjacent pedestal 20, and which is located between the two beam supporting faces, of the pedestal. The other bearings are disposed along the beam, so as to most effectively distribute the upward pressure, exerted by the power shaft during the pressing operation of the die 13.

In the machine illustrated, the power or crank shaft 21 is driven by an intermediate shaft 25, through the agency of two sets of intermeshing gears 26 and 27. The shaft 25 extends parallel to the shaft 21, and is mounted on brackets 28, formed on the pedestals 20. The gears 26 are rigidly mounted on the over-hanging ends of the shaft 25 and each gear is located immediately adjacent to one of the mounting brackets. The gears 27 are rigidly mounted on the overhanging ends of the shaft 21 and, each gear is located immediately adjacent to one of the pedestals 20. The intermediate shaft 25 is driven by means of a driving shaft 29, which, as illustrated, is journaled in the bearings mounted on the brackets 28 and is provided with two gears 31 and 32, which are splined on the shaft and are capable of being moved along it. The gear 31 is capable of being moved into and out of engagement with a gear 33, rigidly mounted on the shaft 25, and the gear 32 is capable of being moved into and out of engagement with a gear 34, which is also rigidly mounted on the shaft 25. The ratio of the gears 31 and 33 is so proportioned, with relation to the ratio of the gears 32 and 34, that they drive the intermediate shaft 25, and consequently the power shaft 21, half as fast as the gears 32 and 34. When it is desired to drive the power shaft 21 at the maximum speed, the gear 32 is shifted longitudinally of the shaft 29, so that it is moved into mesh with the gear 34, and the gear 31 is shifted longitudinally along the shaft, out of mesh with its coöperating gear 33. The gear 31 is moved into mesh with the gear 34 and the gear 32 is moved out of mesh with the gear 34 when it is desired to drive the shaft at the slow speed. Each of the gears 31 and 32 is provided with a set-screw which projects through a laterally extending hub portion 35, formed integrally with the gear and is capable of locking the gear in the desired position on its mounting shaft 29. With this arrangement either of the gears 31 and 32 may be rendered effective in driving the intermediate and the power shaft.

The crank shaft 21 is so formed that it is provided with three crank pins of the usual construction, one pin being located midway between the pedestals 20 of the frame of the machine, and each of the other pins being located adjacent to one of the pedestals. The plunger is operatively connected to the shaft 21 by means of three connecting rods which, as illustrated, are capable of being adjusted for the purpose of varying the relative positions of the dies 12 and 13 and of thereby accommodating the positions of the dies to different thicknesses of sheet metal.

As illustrated, each connecting rod includes a member 36, which is adapted to be pivotally secured to one of the crank pins of the shaft 21, and is provided with a split sleeve 37 having an internally threaded bore. An externally threaded sleeve 38 is screwed into the split sleeve and a link 39 projects through the externally threaded sleeve and is held in place, relatively thereto, by means of check-nuts, which are screwed onto its inner end and engage the inner end of the sleeve 38. The projecting end of the link is provided with an aperture through which a pin 39', carried by suitable lugs formed on a plate 40, projects. Each of the plates 40 is rigidly secured to the plunger 17 by means of bolts, or in any other suitable manner. The sleeve 38 is provided with a flange having holes, formed in the periphery thereof, for the reception of a pin wrench, so that it is capable of being turned in one direction or the other for the purpose of adjusting the length of the piston rods.

The plunger 17 consists of a rectangular member, which has a centrally disposed and longitudinally extending web and upper and lower flanges. The end faces of the plunger are provided with projecting and beveled edges 41, which are engaged by the overhanging edges of plates 42, mounted on the pedestals 20. The plates are arranged in pairs and the plates of each pair are so mounted on the pedestals that they form, in effect, an undercut slot or way, into which the beveled edges of one end of the plunger project. These ways extend vertically and coöperate with each other in holding the plunger in the proper alinement with relation to the stationary die 12. Each plate 42 is capable of being adjusted laterally for the purpose of taking up the wear on the plunger. This is accomplished by providing oblong apertures in the plates, through which their mounting bolts 43 extend, and by also providing a series of adjusting screws or bolts 44 which engage one edge of each plate. The mounting bolts 43, of each plate, are screwed into the mounting pedestal of the plate, and the bolts 44 extend through suitably tapped apertures formed in metal blocks or ribs 44', rigidly mounted on the pedestals. (See Figs. 2 and 5). The die 13 is mounted on the lower face of a flanged member 45, which is T-shaped in cross-section, is bolted on the lower face of the plunger 17 and which reinforces and strengthens the plunger.

The dies 14 and 15 are also actuated by the power shaft 21, through the agency of cams, which are mounted on the power shaft and which operate to oscillate the arms 22 and 22'. In the machine illustrated, two arms 22 are provided for actuating the die 14 and they are both rigidly mounted on a rocker shaft 46, which extends longitudinally of the machine, and is journaled in suitable bearings formed on the frame. Two cam actuated arms 47 are rigidly mounted on the rocker shaft 46, one being located near each end of the shaft, and each rocker arm is provided at its outer or free end, with a roller 48, which engages the cam face of a separate cam 49.

Two arms 22' are provided for actuating the die 15 and they are both rigidly mounted on a rocker shaft 46', which is located on the opposite side of the machine from the shaft 46 and is journaled in suitable bearings mounted on the frame. Two rocker arms 47' are mounted on the rocker shaft 46, and the outer end of each rocker arm 47' carries a roller 48' which engages the peripheral face of a separate cam 49'.

The cams 49 and 49' are similar to each other, and are so located on the power shaft 21 that both of the cams 49 operate, through the agency of the rocker arms 47 and arms 42 to move the die 14 inwardly, at the same time that both the cams 49' move the die 15 inwardly, through the agency of the rocker arms 47' and the arms 22'. One of the cams 49 and one of the cams 49' are located at each end of the machine and are so turned that their operating lobes are located 180 degrees apart. They are also separated from each other, by means of a cam 50, the operation of which will hereinafter be described. The dies 14 and 15 are moved outwardly by means of sector-shaped cams 51, each of which is mounted on one of the gears 27 and is so located that it will engage a roller $52^a$ or $52^b$, carried by one or the other of the cam actuated arms 47 and 47'. The cams are so located and so constructed that they will simultaneously move the dies 14 and 15 outwardly from the position to which they are moved by the cams 49 and 49'.

The cam 50, above referred to, is provided for the purpose of actuating a series of plate lifting bars 52, which are spaced along the die 12, and project through apertures formed in it. The bars extend vertically and their upper ends are so formed that they form a part of the operating face of the die 12, when the bars are in their lowest position. Each bar is mounted on the end of a lever arm 53, which is rigidly mounted on a rocker shaft 54, journaled in suitable bearings, provided on the bed plate 23, and the rocker shaft is actuated by the cams 50 through the agency of suspended frames 56, and rocker arms to which the lower ends of the frames are pivotally secured. Each frame is provided at its upper, or cam engaging end, with a roller 57, which engages the peripheral face of one of the cams 50, and thereby reciprocates the frame, as the crank shaft, and consequently the cams 50, rotate. The arms 55 are located at opposite ends of the shaft 54 and the two operating frames operate simultaneously.

The operation of the apparatus is somewhat as follows: A sheet metal blank is placed in position on the die 12 while the die 13 is in the raised position and the dies 14 and 15 are moved apart, or are located in the outer positions. The machine is then started. The first movement of the power shaft 21 moves the plunger 17 downwardly and thereby compresses the metal blank between the dies 12 and 13. After the plunger has reached the end of its downward stroke, it is raised by the power shaft and consequently releases the blank, which has been initially pressed or distorted. The cams 50 are so located on the crank shaft 21 that they operate to raise the lifting arms 52 to the position shown in Figs. 1 and 4, as soon as the blank is released by the die 13. This moves the blank upwardly to a position between the dies 14 and 15, and the cams 50 are so constructed that the arms 55 hold the blank in that position until it is engaged by the dies 14 and 15, which are then moved inwardly through the agency of the cams 49 and 49'. These cams are so constructed that they do not move the dies 14 and 15 until after the die 13 has moved upwardly out of the path of their travel. The dies 14 and 15 engage the blank, supported on the bars 52, and compress it so that its lateral edges are pressed into engagement with each other, as shown in Fig. 6. This completes a tubular post. The cam 50 is preferably so formed that the bars 52 do not move downwardly to their lowest position until after the blank, supported by them, has been operated upon by the dies 14 and 15. It will be understood that the dies 14 and 15 are notched to receive the bars 52, and so that they can move into the closed position, while the bars are in their raised positions. This, however, is not essential, since the cams 50 may be so formed that the bars 52 will move downwardly as soon as the blank is engaged by the dies 14 and 15.

After the dies 14 and 15 have reached the inner or closed position and are again moved outwardly by the operation of the cams 51 to the position illustrated in Figs. 1 and 4, the machine is automatically stopped. This is accomplished in the machine illustrated by providing a loose pulley 61 on the shaft 29, a clutch mechanism 62 for operatively locking the pulley to the shaft, and means for automatically actuating the clutch mechanism to release the pulley from the shaft when the machine has completed one operation.

The clutch mechanism may be of any desired type, and, as illustrated, is actuated by means of a sleeve 63, which is movable along the shaft 29, and is capable of being actuated by means of a lever 63'. The lever is operatively connected to a longitudinally shiftable rod 64, which is pivotally secured to the operating handle 65 of the machine. The handle 65 is capable of moving the rod 64 longitudinally and consequently of shifting the sleeve 63 so as to render the clutch mechanism 62 operative. A latch 66 is provided for holding the rod 64 in a set position; that is, in the position, in which the clutch mechanism 62 is operative, and means are provided for retracting the rod and thereby moving the sleeve 63 to render the clutch mechanism 62 inoperative, when the rod is released by the latch. The means illustrated consists of a weight 67, which is secured to the rod by means of a cord, which extends over a guide pulley 68. The latch is provided with an arm 69, which projects to an accessible position adjacent to the handle 65, and which is yieldingly held, by a spring 71, in such a position that it holds the latch in the operative position with relation to the rod. When the operator shifts the rod in the direction indicated by the arrow in Fig. 5, the clutch mechanism 62 is rendered operative and the latch 66 engages a shoulder or a plate 72, on the rod and holds the rod in the clutch-operating position.

Means are employed for releasing the latch 66 and thereby permitting the weight 68 to move the rod and render the clutch mechanism 62 inoperative after the machine has completed one operation. As illustrated, the means consists of a worm 72 mounted or formed on the end of the shaft 29, a worm wheel 73, which meshes with the worm 72 and a stop 74 carried by the worm wheel, which is adapted to engage the latch 66 and release the bar when the worm wheel has made one revolution. The number of teeth on the worm wheel are so proportioned that it will make one revolution during the time it takes the machine to complete one operation, while it is being driven by the slow speed gears 31 and 33. When the machine is driven through the high speed gears, that is, through the gears 32 and 34, it is necessary to provide means for actuating a removable stop 75, which may be located on the gear diametrically opposite to the stop 74, and which is also capable of actuating the latch. The handle 69 may be moved by the operator at any time during the operation of the machine for the purpose of releasing the latch 66 and thereby stopping the machine.

The machine illustrated is also provided with an automatically actuated brake which, as illustrated, is thrown into operation by the weight 67, after the clutch mechanism 62 is rendered inoperative. The brake, as illustrated, essentially consists of a clutch mechanism, similar to the mechanism 62, except that the member engaged by the rotating member, which is operatively connected to the shaft 29, is stationary and therefore tends to check the speed and to stop the shaft 29, when the rotating member on the shaft is moved into engagement with it. Any suitable type of clutch mechanism may be employed. In the drawings we have illustrated a stationary portion 78, rigidly secured to the bracket 28 and adapted to coöperate with a rotatable member splined on the shaft 29. The sleeve 63, to which the lever 63' is operatively connected, is adapted to shift the splined rotatable member and to thereby operate the brake mechanism, when it is moved longitudinally of the shaft 29, toward the brake mechanism. When the latch 66 releases the rod 64, the rod moves, in response to the pull of the weight 67, in a direction opposite to that indicated by the arrows in Figs. 2 and 5, and it shifts the lever 63', which moves the sleeve 63 so as to render the clutch mechanism 62 inoperative, and then to set the brake. When the sleeve 63 is in the intermediate position between the clutch mechanism 62 and the brake, neither is operative. With this construction the first movement of the handle 65, to start the machine, releases the brake and, as the motion of the handle is continued, the clutch mechanism 62 is finally rendered operative and the machine is started. By employing such a construction it is possible to stop the machine, at a desired point of its operation, after each post-forming operation.

The dies employed, in the machine illustrated, are so constructed that they form a post which is trifoliate in cross-section and is tapered from one end to the other; that is, the finished post formed by the machine is substantially triangular in cross-section, but the apexes or ridges are rounded and longitudinal grooves are so formed between the ridges, that the cross-section of the post resembles the outline of a compound leaf having three points. In Figs. 6 and 10 of the drawings we have illustrated a post having two longitudinally extending ridges 79, a ridge 81, along which the abutting edges of the forming blank extend, and grooves 82 which extend longitudinally of the post, and each of which is located between two adjacent ridges. While the machine may be employed in the formation of a different form of trifoliate post, we have found it desirable to so form the post, that the abutting edges of the forming blank are located along the ridge 81. It will be understood that the abutting edges of the form may be located along one of the grooves, but, by employing the construction illustrated, the operation of forming the post is simplified, since the metal blanks employed, may be so formed in the initial pressing operation that all that is necessary, in the final or finishing operation, is to bend or press the lateral edges, of the blank inwardly so that they abut against each other. In other words, the first operation of forming a post from sheet metal consists in distorting the sheet metal blank so as to form the grooves 82, in the blank, and so as to partially form the ridges 79. The metal adjacent to the lateral edges of the blank is also so formed that the ridge 81 is formed by merely moving the lateral edges into engagement with each other. When this operation is completed the blank is substantially trough-shaped, with its lateral edges extending upwardly, as shown in Fig. 4, and the ridges 79 are so formed that they are completed during the operation of forcing the lateral edges of the blank into contact with each other. This last operation, as has been said, is accomplished by means of the jaws or dies 14, and 15, which are adapted to move inwardly and to engage the partially finished blank after it has been lifted, by the bars 52, to the position illustrated in Fig. 4. Each of the dies 14 and 15 is provided with an inclined face 83, which engages the curved edges of the blank, as the dies, move inwardly, and which operates to force the edges toward each other.

Additional means, other than the inclined faces 83, of the dies, must be employed in bending the metal of the blanks, so that their lateral edges abut against each other, and we therefore provide means for pressing the partially formed ridges 79 after the blank is bent to, and is held in a position with its lateral edges in contact with each other. This is accomplished by providing longitudinally extending grooves 84 in the dies 14 and 15, which are so located that they engage the ridges 79 on the sheet metal blanks, when the dies 14 and 15 are moved to the closed position. The grooves are so formed that they press the walls of the ridges 79 toward each other and to such positions that the lateral edges of the blank are pressed into contact with each other, and are held in that position in the finished post.

In the drawings we have illustrated means for cutting or stamping wire locking lugs from the metal of the post, during the operation of forming the post. The means illustrated consists of a series of punches 86, which are secured to the movable die 13, and a series of coöperating dies 87, which are formed in metal strips 88, mounted on the stationary die 12.

The punches are formed separately, are mounted in apertures formed in the face of the die 13 and are secured in place by means of set-screws 89, which project laterally through the die 13 and through apertures 91, formed in the punches 86. The punches are alined along the portion of the die 13, which forms the groove 82 between the ridges 79 on the separate blanks, and the strips 88 are correspondingly located on the die 12, and are secured in place in a slot 92, which extends longitudinally of the die. The punches are so constructed that they cut wire locking tongues 93, from the metal blanks, which are similar to the tongues illustrated and described in patent No. 1,037,345 of September 3, 1912, and which are capable of being looped back into locking engagement with the slots from which they are cut. Each tongue is provided with a head 94, see Fig. 10, and each slot cut in the sheet metal blank, by the formation of the tongue, is enlarged at points adjacent to the head, by completely severing a piece of metal from the blank on each side of the tongue and immediately adjacent to the under side of the head. Each punch 86 is therefore provided with two projecting lugs 95, which are located on either side of the head cutting portion of the punch and which coöperate with apertures 86', formed in the die strip 88, in enlarging the slots by completely severing the above referred to pieces of metal from the blanks. The apertures 86' extend through the die strip 88, communicate with downwardly extending apertures formed in the die 12 and permit the pieces of sheet metal, severed by the lugs 95, to drop through both the dies onto the bed plate of the machine. The punches 86 and their coöperating dies are so formed that they not only form the tongues 93, but also press them outwardly, with relation to the completely formed post, so that they occupy wire receiving positions. This is accomplished by extending the punches so that they project downwardly the desired amount into the dies 87, when the die 13 has reached the end of its downward stroke. As illustrated, we have also provided a face 96, on each die 88, which forms a support for the partially severed tongues when the die 13 is in the lowest position, and therefore coöperates with the bottom face of the punch in pressing the tongue into the desired position.

The tongue punching operation is substantially coincident with the initial pressing operation, and, after the tongues have been cut and the blank is initially depressed or distorted, the bars 52 lift the blanks and thereby free the tongues 93 from the dies 87. The die strips 88 are so spaced, along the die block 12, that the bars 52 project upwardly through the dies 12 and between the ends of adjacent strips 88.

It will be understood that the tongues 93 may be formed in various ways and that the construction of the punches 86 and their coöperating dies 87 may be materially modified, without departing from our invention.

What I claim is:

1. In a machine for forming sheet metal fence posts, a pair of forming dies for initially compressing sheet metal blanks to trough-shaped forms, and a pair of finishing dies for receiving blanks from the forming dies for pressing the lateral edges of the initially compressed blanks into non-overlapping abutting engagement with each other, and for longitudinally distorting the blanks at points between their lateral edges, while their lateral edges are held in engagement with each other.

2. A machine of the character described, comprising dies for initially distorting a metal blank and forming therein alternately arranged grooves and ridges, a plunger for actuating one of said dies, and dies movable at an angle to the line of motion of the plunger for bending an initially compressed blank about ridges formed thereon, for pressing the lateral edges of the blank into non-overlapping engagement with each other and for distorting the metal ridges of the blank to permanently hold the edges in contact with each other.

3. In a machine of the character described, a pair of dies for initially distorting metal blanks, a pair of finishing dies movable toward and away from each other, for pressing the initially compressed blanks into substantially tubular form, means for moving one of said first mentioned dies to an operative position between the finishing dies, means projecting through one of the first-mentioned dies for moving the initially compressed blanks from the first mentioned dies into the path of travel of the finishing dies and means for moving the finishing dies inwardly, after the vertically movable die has been moved out of the path of their travel by said plunger.

4. In a machine of the character described, a pair of dies for initially distorting metal blanks, a pair of finishing dies movable toward and away from each other, for pressing the initially compressed blanks delivered by the first mentioned dies, means for moving one of the first mentioned dies to an operative position between the finishing dies, means, coöperating with said first mentioned dies, during the pressing operation, for moving initially compressed blanks from the first mentioned dies into the path of travel of the finishing dies and for coöperating with the finishing dies during their pressing operation, and means for moving the finishing dies inwardly after the movable die of said first mentioned dies has been moved out of the path of their travel.

5. In a machine of the character described, means for initially stamping sheet metal blanks and means for pressing the initially stamped blanks into tubular form, a driving agent for actuating said machine, manually operated means for operatively connecting said driving agent to the machine and means controlled by the driving means for automatically disconnecting the driving agent from the machine, and a brake actuated by said last mentioned means.

6. In a machine of the character described, means for initially compressing a sheet metal blank, comprising a pair of relatively movable dies, a second pair of dies for compressing metal sheets after they have been initially compressed, bars movable through apertures formed in one of said first mentioned dies and means for moving said bars to deliver the initially compressed sheets to the second pair of dies.

7. In a machine of the character described, a pair of relatively movable dies, for initially compressing sheet metal blanks, a second pair of dies for receiving initially compressed blanks, conveyer bars for delivering the blanks from the first to the second pair of dies, a power shaft for actuating the first mentioned dies, cam-actuated rocker arms for actuating the second pair of dies and a suspended cam-actuated frame for actuating said bars.

8. In a machine of the character described, a pair of movable dies for initially compressing sheet metal blanks, means mounted on said dies for striking wire locking tongues from the metal during the forming operation and a second pair of dies for compressing the initially compressed blanks into substantially tubular shapes.

9. In a machine of the character described, a pair of relatively movable dies for pressing sheet metal blanks, punches removably mounted in apertures provided in one of said dies, and projecting beyond the operative surface of their mounting die, and punch dies formed in a die strip and mounted on the other relatively movable die, the exposed surface of the strip coöperating with the operative surface of the mounting die during the blank pressing operation.

10. In a machine of the character described, means for cutting tongues from sheet metal comprising, a punch having a lug-cutting portion and projecting lugs formed thereon, and located at each side of said lug-cutting portion, and a die coöperating with said punch and said projecting lugs.

11. In a machine of the character described, a punch and die for cutting tongues from sheet metal blanks and means mounted on the punch and coöperating with the die for completely severing pieces of metal from the blank, prior to the lug-cutting operation.

12. In a machine of the character described, a pair of dies having longitudinally extending converging ridges and coöperating grooves thereon, for initially compressing sheet metal blanks and a second pair of converging dies for pressing the initially compressed blanks and having converging grooves formed therein for receiving ridges on the initially compressed blanks.

13. In a machine of the character described, a plurality of separate means for consecutively forming sheet metal posts, driving means for the machine, speed change gears between the machine and the driving means, and adjustable means, actuated by the driving means, for stopping the machine at a predetermined point.

14. In a machine of the character described, a power shaft, a driving shaft for the power shaft, speed change gears between the power shaft and the driving shaft, a driving agent, means for rendering said agent effective in actuating the driving shaft, a release mechanism for rendering said means ineffective, and means driven by the driving shaft and having adjustable stops for actuating said releasing mechanism and stopping said machine at a determined point in its cycle.

15. In a machine of the character described, a pair of forming dies for initially compressing metal blanks, a pair of finishing dies for pressing the initially compressed blanks into substantially tubular form, said dies being so located that the path of action of one pair crosses the path of action of the other pair, and bars for coöperating with the forming dies during their pressing operation, for moving initially compressed blanks from the forming dies into the path of action of the finishing dies.

16. In a machine of the character described, a pair of forming dies for initially compressing sheet metal blanks, a pair of finishing dies for compressing initially compressed blanks, movable bars for coöperating with the forming dies, during their pressing operation, and means for moving said bars to deliver initially compressed blanks into the path of action of the finishing dies.

17. In a machine of the character described, a pair of relatively movable dies, for initially compressing sheet metal blanks, a second pair of dies for receiving initially compressed blanks, said dies being so located that the path of action of one pair crosses that of the other pair, conveyer bars projecting upwardly through one of the dies of the first-mentioned pair, and for delivering blanks from the first to the second pair of dies, a power shaft for actuating the first-mentioned dies, rocker arms, actuated by the power shaft, for actuating the second pair of dies, and means, actuated by the power shaft, for actuating the bars.

18. In a machine of the character described, a pair of relatively movable dies for initially compressing sheet metal blanks, a second pair of dies for receiving initially compressed blanks, and conveyer bars for moving the blanks from the first-mentioned to the second pair of dies and for coöperating with the second pair of dies, during their operation.

19. In a machine of the character described, a pair of dies for initially compressing sheet metal blanks, means mounted on said dies for striking wire-locking tongues from the blanks, during the initial compressing operation, and a pair of finishing dies for receiving the initially compressed blanks from the first-mentioned dies and for bending them into substantially tubular form 20. A machine of the character described, comprising, dies for initially compressing a metal blank, and for forming therein alternately arranged grooves and ridges, means mounted on said dies for striking lugs from the metal of the blank, during the compressing operation, and finishing dies, movable at an angle to the line of action of the first-mentioned dies, for bending the blank about one of the ridges formed therein, and for moving its lateral edges into abutting engagement with each other.

21. In a machine of the character described, a pair of initial distorting dies for initially distorting sheet metal blanks to a substantially trough-shaped formation, means mounted on said dies for cutting tongues from the sheet metal blanks, during the pressing operation, and means, coöperating therewith, for completely severing pieces of metal from the blank prior to the lug-cutting operation, finishing dies for pressing the initially compressed blanks into substantially tubular form, and means for conveying the initially compressed blanks from the initial to the finishing dies.

22. In a machine of the character described, initial dies for initially compressing sheet metal blanks, means, mounted on said dies, for striking lugs from the blanks and for completely severing pieces of metal from the blanks on each side of the lugs, and finishing dies for bending initially compressed blanks into substantially tubular form.

23. In a machine of the character described, a pair of initial dies, having longitudinally extending converging ridges and coöperating grooves formed thereon, for initially compressing sheet metal blanks into a substantially trough-shaped formation, a second pair of dies for receiving initially compressed blanks, and for bending initially compressed blanks about ridges formed therein, for the purpose of moving their lateral edges into abutting engagement with each other, each of the second pair of dies being provided with a groove for receiving a ridge of each blank compresed, and for distorting the metal of the ridge while the edges of the blank are in engagement with each other.

24. In a machine of the character described, a pair of relatively reciprocable dies, for initially pressing sheet metal blanks, punches mounted in apertures formed in one of the dies and projecting beyond the operative face of their mounting die, and punch dies formed in a die strip and mounted on the other relatively reciprocable die, and reciprocable finishing dies for engaging unpunched portions of initially compressed blanks and for pressing their lateral edges into abutting engagement with each other.

25. In a machine for forming fence posts, a pair of forming dies for initially compressing metal blanks into substantially trough-shaped forms, and for forming alternately arranged converging grooves and ridges, in the blanks, and means for moving the lateral edges of initially compressed blanks into engagement with each other and for completing the formation of ribs in the blank, while the lateral edges are in abutting engagement with each other.

26. In a machine of the character described, initial forming dies for initially compressing sheet metal blanks and for striking wire-engaging tongues therefrom, finishing dies, operating at an angle to the initial dies, for pressing the partially formed dies into tubular form, means for freeing the wire-engaging tongues from their forming dies, for moving the partially distorted blanks from the initial to the finishing dies and for coöperating with the finishing dies during the finishing operation.

27. In a machine of the character described, initial forming dies for initially compressing sheet metal blanks, punches and dies for striking wire-locking tongues from the metal blanks, finishing dies for receiving the initially compressed blanks and for pressing them into substantially tubular form, and means for freeing the wire-locking tongues from their punching dies, for moving the initially compressed blanks to the finishing dies and for coöperating with the finishing dies during the finishing operation.

28. In a machine of the character described, dies for successively engaging sheet metal blanks and for bending them into tubular form, a driving agent for the machine, a clutch mechanism for operatively connecting the agent to the machine, a brake for stopping the machine, and means controlled by the driving agent, for actuating the clutch mechanism to operatively disconnect the agent from the machine and to set said brake.

29. In a machine of the character described, dies for successively engaging sheet metal blanks and for bending them into substantially tubular form, a driving shaft for the machine, a driving agent for said shaft, a clutch between the shaft and said agent, a release mechanism for actuating the clutch to operatively disconnect the shaft from the agent, and adjustable means, driven by the agent, for actuating the release mechanism and for thereby stopping the machine at a determined point in its cycle.

30. In a machine of the character described, dies for successively engaging sheet metal blanks and for bending them into tubular form, a driving shaft through which said dies are actuated, a driving agent for the shaft, a clutch mechanism for operatively connecting the agent to the shaft, a brake for stopping the shaft, a release mechanism for disengaging the clutch and setting the brake, and means, driven by the agent and having adjustable stops located thereon, for engaging and actuating said release mechanism.

In testimony whereof, we have hereunto subscribed our names this twenty-second day of November, 1912.

GEORGE G. McGLAUGHLIN.
ANTON MILL.

Witnesses:
E. M. McCALLISTER,
ANTON MILL, Jr.

Copies of this patent may be obtained for five cents each, by addressing the "Commissioner of Patents, Washington, D. C."